United States Patent
Brien et al.

(10) Patent No.: US 9,027,689 B1
(45) Date of Patent: May 12, 2015

(54) RECIPROCATING MOTION APPARATUS FOR A STROLLER

(71) Applicants: Claire M. Brien, Royal Oak, MD (US); Stephen A. Brien, Royal Oak, MD (US)

(72) Inventors: Claire M. Brien, Royal Oak, MD (US); Stephen A. Brien, Royal Oak, MD (US)

(*) Notice: Subject to any disclaimer, the term of this patent is extended or adjusted under 35 U.S.C. 154(b) by 95 days.

(21) Appl. No.: 13/738,223

(22) Filed: Jan. 10, 2013

(51) Int. Cl.
*B62B 9/22* (2006.01)

(52) U.S. Cl.
CPC .......................... *B62B 9/22* (2013.01)

(58) Field of Classification Search
CPC ........................................................ B62B 9/22
USPC ................................................ 180/166, 65.1
See application file for complete search history.

(56) References Cited

U.S. PATENT DOCUMENTS

| | | | |
|---|---|---|---|
| 1,553,889 A * | 9/1925 | Boettcher | 180/166 |
| 1,586,411 A * | 5/1926 | Csima | 180/166 |
| 1,662,754 A * | 3/1928 | Millard | 180/166 |
| 2,644,958 A | 7/1953 | Davis | |
| 3,048,419 A * | 8/1962 | Fredman | 280/31 |
| 3,564,626 A | 2/1971 | Nelson | |
| 3,820,614 A * | 6/1974 | Askinazy | 180/166 |
| 4,629,950 A * | 12/1986 | Ching | 318/285 |
| 4,837,876 A | 6/1989 | Levy | |
| 4,856,130 A * | 8/1989 | Berkovich | 5/109 |
| 5,249,640 A * | 10/1993 | Grove | 180/166 |
| 5,572,903 A * | 11/1996 | Lee | 74/44 |
| 5,873,425 A * | 2/1999 | Yang | 180/65.6 |
| 5,937,961 A * | 8/1999 | Davidson | 180/166 |
| 6,519,792 B2 * | 2/2003 | Chen | 5/109 |
| 6,588,527 B2 * | 7/2003 | Lerner et al. | 180/166 |
| 7,971,885 B2 * | 7/2011 | Sanders et al. | 280/47.1 |
| 7,987,933 B1 * | 8/2011 | McClellan et al. | 180/65.1 |
| 8,020,944 B2 * | 9/2011 | Thompson | 301/5.1 |

* cited by examiner

*Primary Examiner* — Katy M Ebner
(74) *Attorney, Agent, or Firm* — Robert C. Montgomery; Montgomery Patent & Design

(57) ABSTRACT

A reciprocating infant stroller assembly for automatically producing a reciprocating forward and backward rocking motion on an infant stroller is disclosed. The reciprocating infant stroller assembly includes a battery-powered motor having a linkage which is connects to an infant stroller wheel to induce a reciprocating motion. The reciprocating infant stroller assembly further includes a power switch and a speed control for controlling the frequency of motion.

17 Claims, 5 Drawing Sheets

RECIPROCATING MOTION APPARATUS FOR A STROLLER

RELATED APPLICATIONS

The present invention was first described in U.S. Patent Provisional No. 61/584,892 filed on Jan. 10, 2012 the entire disclosures of which are incorporated herein by reference.

FIELD OF THE INVENTION

The present invention relates to infant strollers. More particularly, the present invention is directed to infant strollers that automatically produce rocking motions.

BACKGROUND OF THE INVENTION

As many parents can attest infants enjoy being pushed in infant strollers. The motions created by being pushed combined with changing scenery and being close to a parent or caregiver seems to be very comforting and enjoyable for infants. Parents and caregivers pushing infant strollers also benefit from the activity because of the peace of mind it creates as well as the health benefits it provides.

Because infant strollers are popular they come in a wide variety of styles with a wide variety of features. Lightweight infant strollers are popular; as are infant strollers with double seats for carry two (2) or more infants, sun bonnets, straps, harnesses, storage baskets, and pouches, among other features. However, the basic idea of providing motion is seldom if ever sought to be enhanced.

One (1) beneficial type of motion is rocking motion. Different infants want different degrees of rocking motion. In addition different ground surfaces such as concrete, bricks, and asphalt as well as different terrains produce different rocking motions, both in degree and frequency. Because of this caregivers often enhance the rocking motion by using the infant stroller handle. However, this restricts the caregiver from performing other tasks. In some instances it would be beneficial to provide a rocking motion even if the infant is not being pushed. This would free the parent or other caregiver to do other tasks.

In view of the foregoing an infant stroller that automatically produces a rocking motion would be beneficial. Preferably the rocking motion could be easily adjusted or turned off if not needed. Even more beneficial would be an automatically rocking infant stroller that frees a caregiver to perform other tasks. Preferably such an automatic rocking infant stroller would be battery powered and easily stored and transported. Of course, quiet operation would be important, as would ease of use and low cost. Ideally, the rocking motion would be produced by an assembly that can be incorporated into new infant strollers or retro-fit into existing infant strollers.

SUMMARY OF THE INVENTION

The principles of the present invention provide for infant strollers that automatically produce rocking motions. Such rocking motions may be adjusted or turned off and may be powered by batteries. Preferably such infant strollers have quiet operation and would be powered by a rocking motion inducing assembly that can be incorporated into new infant strollers or retro-fit onto existing infant strollers.

A reciprocating infant stroller that is in accord with the present invention includes an infant stroller having a frame, an axle, a push handle, and a wheel. A drive assembly is mounted on the infant stroller. The drive assembly includes an electric motor having a rotating shaft for producing rotary motion, a battery for powering the electric motor, an electrical junction box that retains electrical connections for wiring the battery to the electric motor, and a drive arm assembly. The drive arm assembly is attached at one (1) end to the rotating shaft and converts the rotary motion into an oscillating motion. The drive arm assembly further includes a drive stud that is selectively in contact with the wheel. The reciprocating infant stroller further includes a control module that is mounted on the infant stroller and a wiring harness. The control module includes a power switch, an adjustable speed control for controlling the power applied to the electric motor, and electrical connections that support connecting the power switch and the adjustable speed control to the electric motor. The wiring harness electrically interconnects the electrical junction box and the control module. This provides user-controlled electrical power to the battery from the electric motor, which causes the motor to produce various rotary motion rates which are converted into oscillating motion that moves the drive stud. When the drive stud moves it presses on the wheel, thus imparting a rocking motion to the infant stroller.

Beneficially the reciprocating infant stroller has the drive assembly mounted to either the axle or the frame while the control module is attached to the push handle by at least one (1) restraining strap that is laced through mounting channels of the control module. In practice the wiring harness may be routed along the frame and secured to the frame member by a plurality of wire ties. Beneficially the wiring harness is terminated at each end by similar connecting plugs that mate with a control module jack and with a junction box connecting jack.

Also beneficially the drive assembly includes a base plate that holds the motor and the electrical junction box, as well as a battery compartment that retains the battery. In practice the battery compartment will include a latched lid. To attach the base plate to the infant stroller the base plate may have a fastening aperture and an attachment bolt that passes through the fastening aperture and which is configured to secure the drive assembly to the infant stroller.

Preferably the drive arm assembly includes a crank arm having a motor shaft aperture at one end that receives the rotating shaft and a crank arm hub at the other end that attaches to a crank arm assembly. The crank arm assembly is attached to the crank arm hub at one (1) end and to the drive stud at its other end. The drive arm assembly preferably includes a release mechanism for disconnecting the drive stud from the crank arm assembly. That release mechanism may include a drive stud socket for receiving the drive stud and a spring-loaded sleeve that is configured to capture the drive stud when in the drive stud socket. Then, the drive stud can be removed from the drive stud socket when the spring-loaded sleeve is slid away. Beneficially the crank arm assembly is attached to the crank arm by a pitman ball joint while the release mechanism is attached to the crank arm assembly by a pitman arm. The pitman arm may be adjustable in length.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
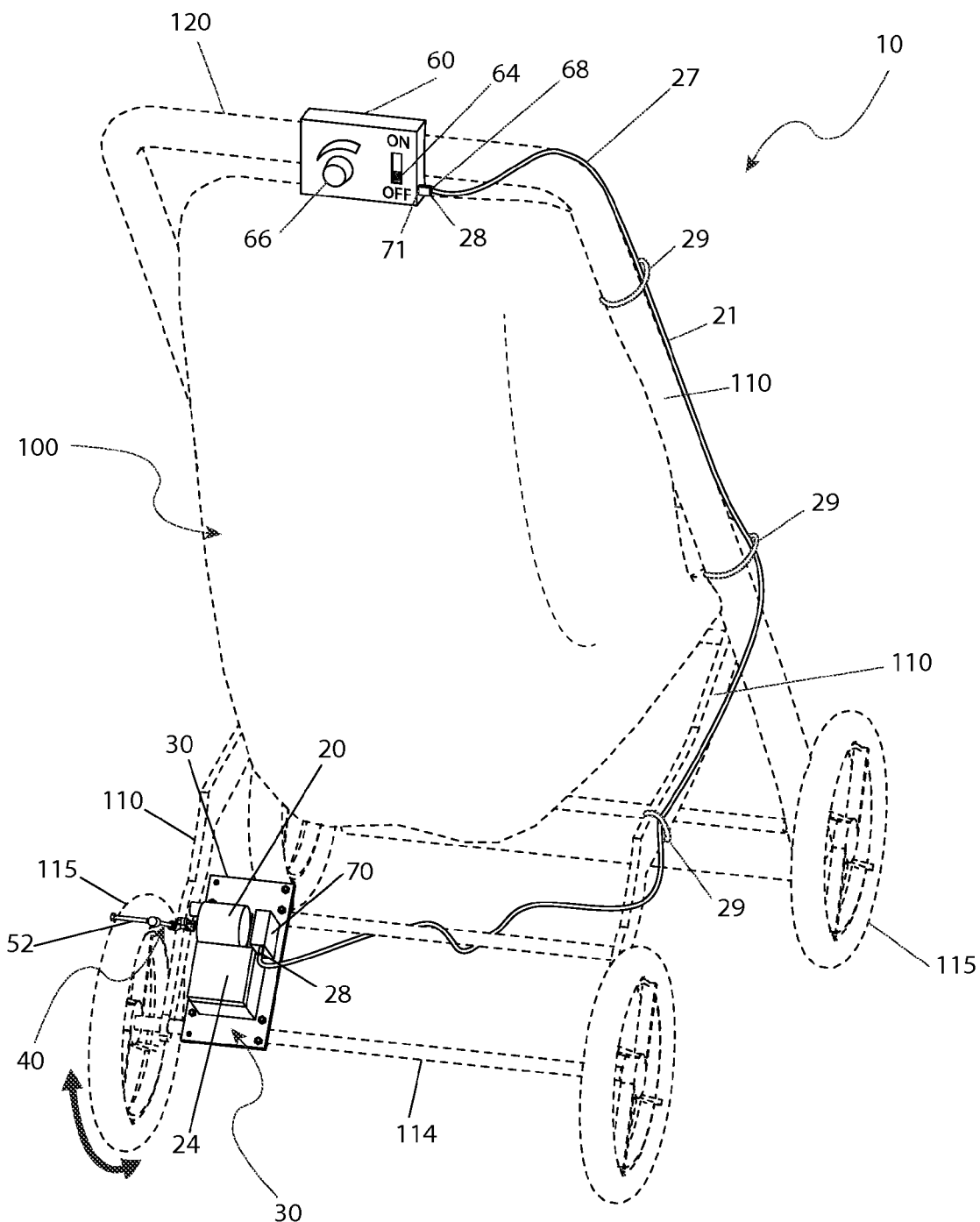
FIG. 1 presents a rear isometric view of a reciprocating infant stroller assembly 10 that is in accord with a preferred embodiment of the present invention.

DESCRIPTIVE KEY 10 reciprocating infant stroller assembly
20 drive assembly
21 motor
22 motor shaft
23 battery
24 battery compartment
25 lid
26 wiring
27 wiring harness
28 connecting plug
29 wire tie
30 base plate
32 fastening aperture
34a "U" bolt
34b "J" bolt
36 nut fastener
37 motor shaft aperture
40 drive arm assembly
41 motor shaft nut
42 motor shaft flat
43 crank arm
44 crank arm hub
45 crank arm aperture
46 pitman ball joint
47 pitman ball joint nut
48 pitman arm
49a pitman adjusting nut
49b pitman tensioning nut
51 release mechanism
52 drive stud
53 drive stud nut
56 drive stud socket
60 control module
61 mounting channel
62 restraining strap
64 power switch
66 speed dial
68 control module jack
70 electrical junction box
71 connecting jack
75 latch
100 infant stroller
107 sleeve
110 frame member
114 axle
115 wheel
120 push handle

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 4:
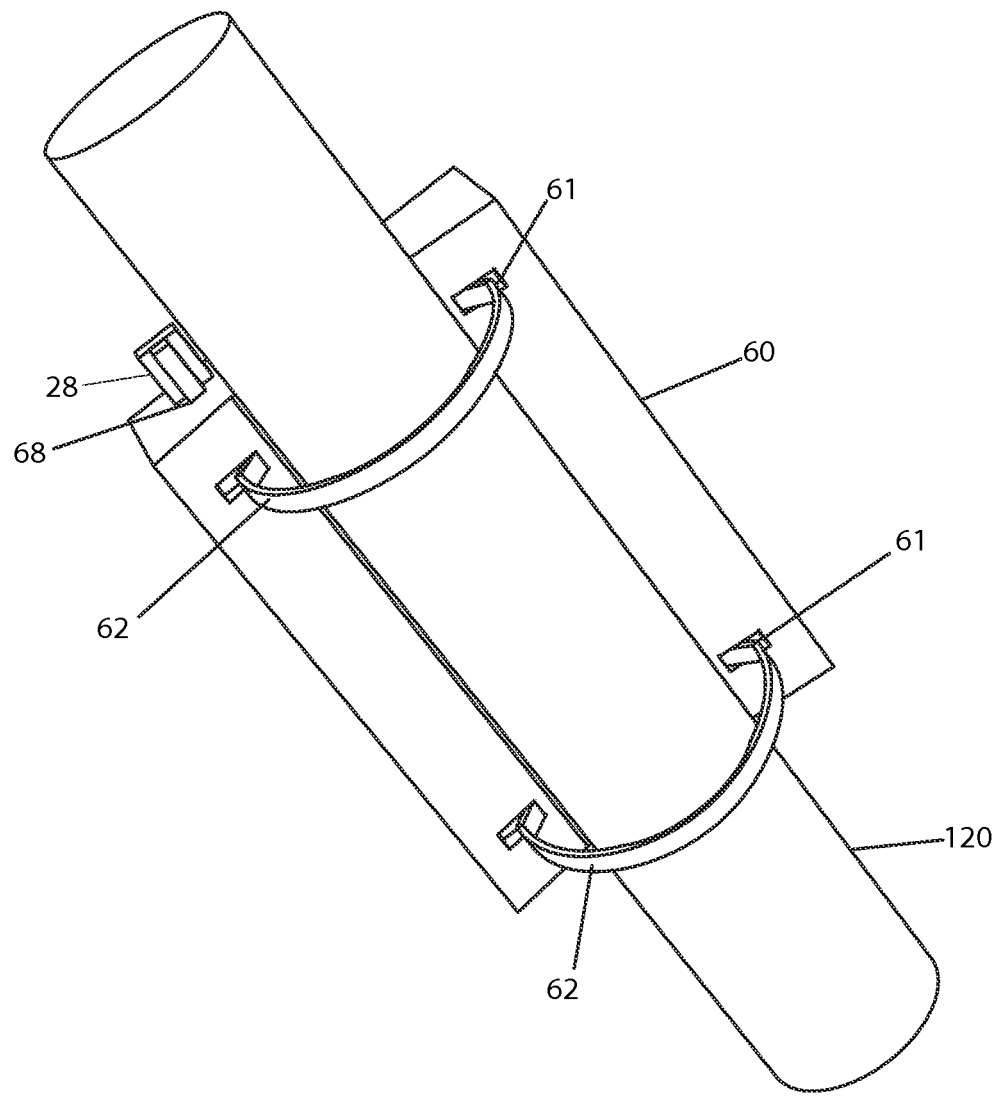
FIG. 4 is an isometric view of the rear of a control module 50 attached to a push handle 120 of the reciprocating infant stroller assembly 10 shown in FIG. 1; and, FIG. 5 is an electrical block diagram of the motor and the controls of the reciprocating infant stroller assembly 10.

Refer now to FIG. 1 for a rear isometric view of a reciprocating infant stroller assembly 10 which is in accord with a preferred embodiment of the present invention. The reciprocating infant stroller assembly 10 includes an infant stroller 100 and a drive assembly 20 that is mounted to an axle 114, or alternately, to a frame member 110. The operation of the motor 21 is controlled by a control module 60, which is preferably mounted to a push handle 120 of the infant stroller 100. Referring now to FIG. 4, the control module 60 is mounted to the push handle 120 by restraining straps 62 that are wrapped around the push handle 120 and then laced through mounting channels 61 that are located in the base of the control module 60. The restraining straps 62 are then tightened, such as by using an internal ratchet mechanism to secure the control module 60 to the push handle 120.

Figure 2:
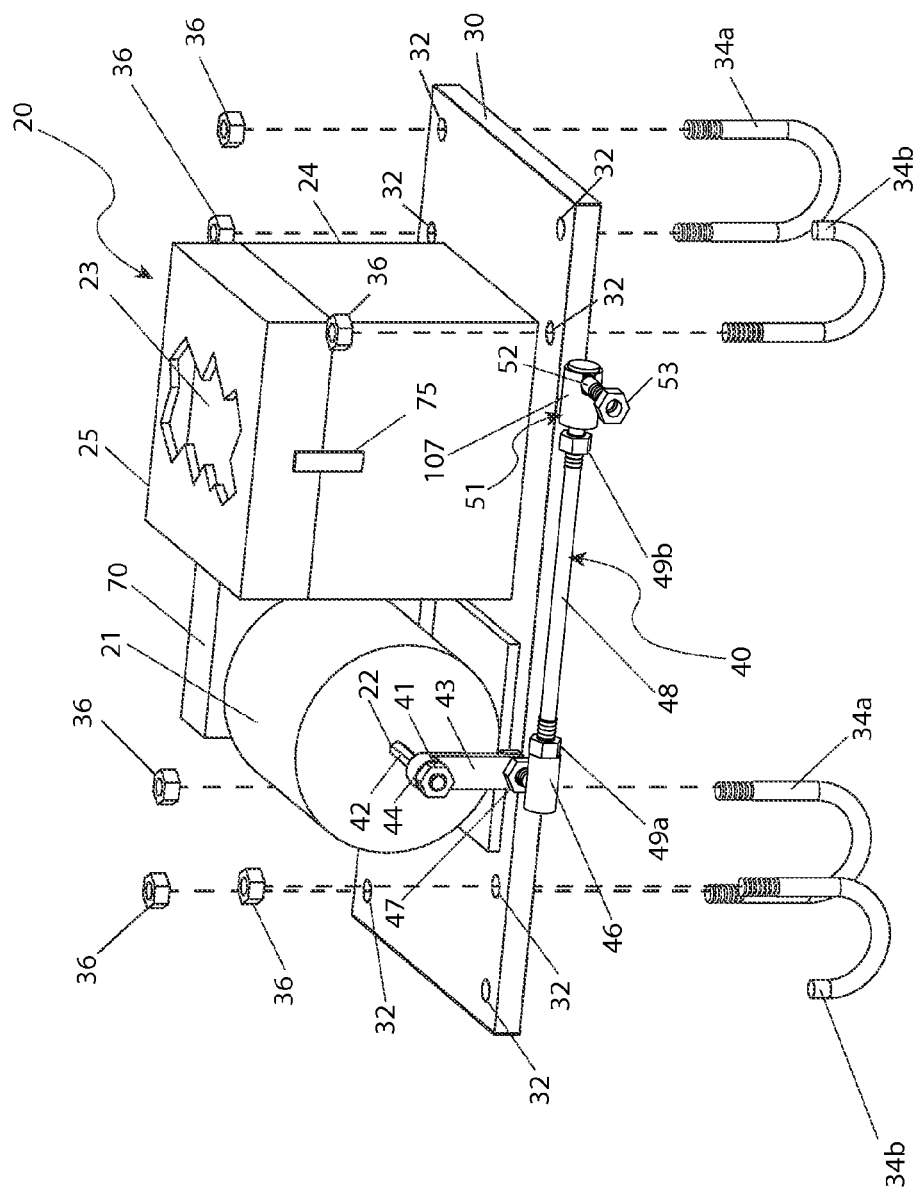
FIG. 2 is a perspective view of the drive train 20 of the reciprocating infant stroller assembly 10 shown in FIG. 1.

Referring now to FIG. 2, the drive assembly includes an electric motor 21, a battery 23, and a drive arm assembly 40 (described subsequently) that converts the rotary motion of the motor shaft 22 into an oscillating motion at a drive stud 52.

Figure 3:
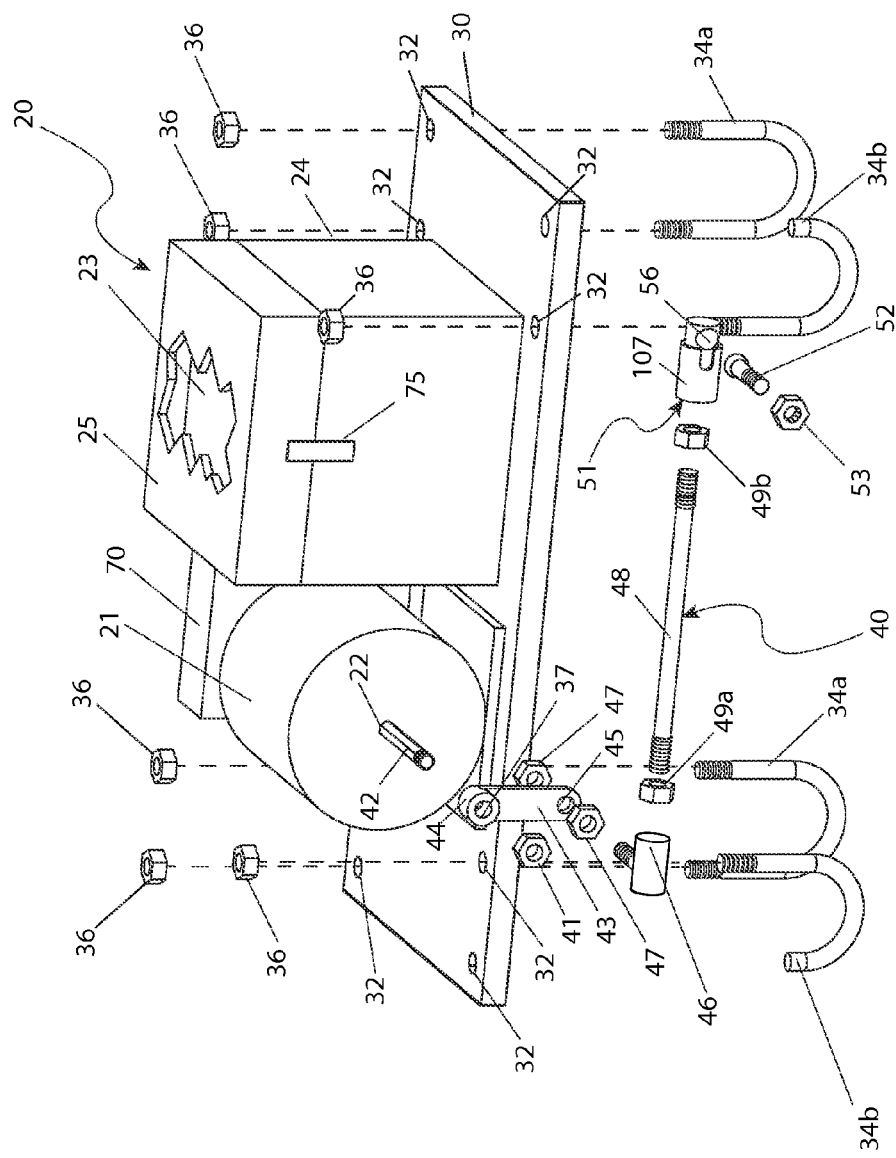
FIG. 3 is a partially exploded view of the drive arm assembly 40 of the drive train 20 shown in FIG. 2.
Figure 5:
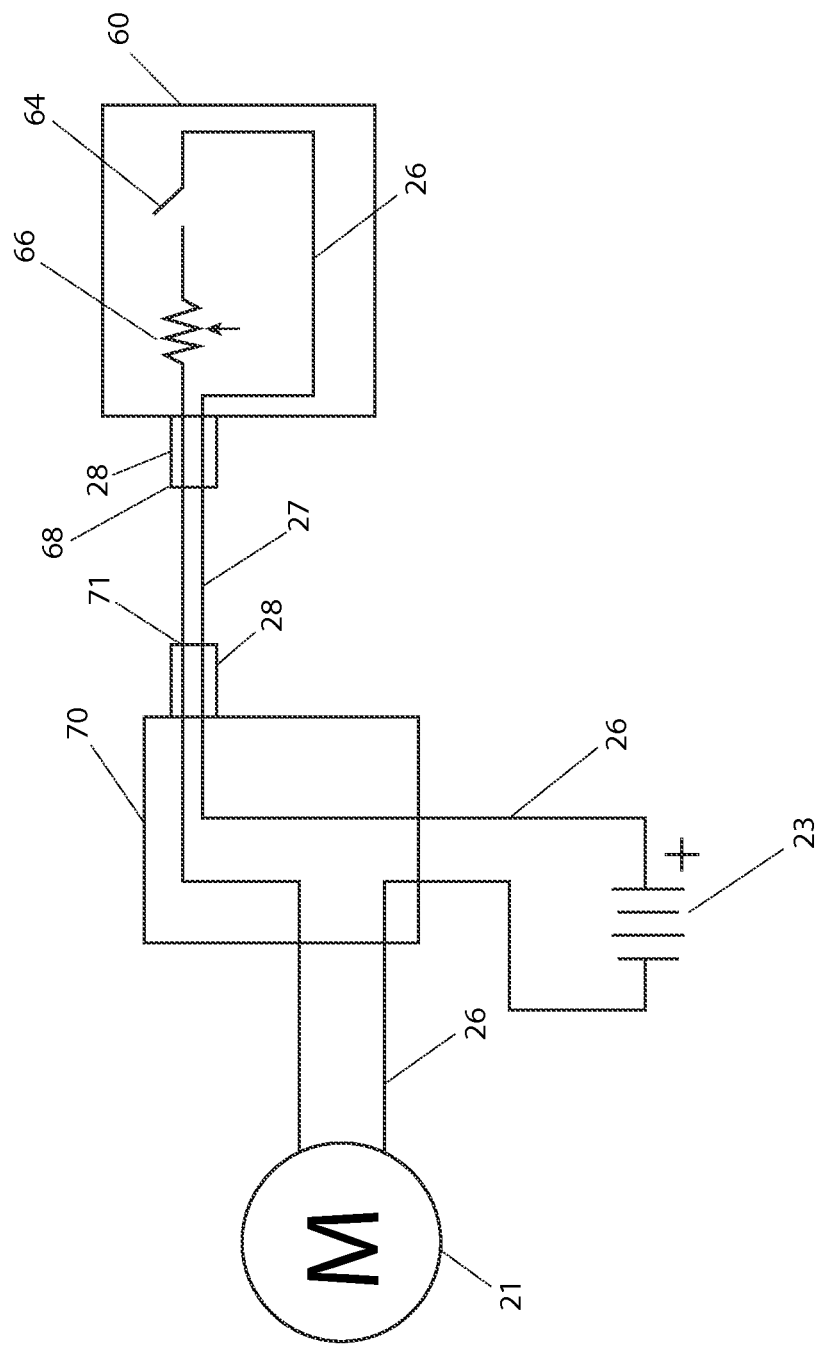

Refer now to the mechanical configurations shown in FIGS. 1-3 and to the electrical diagram shown in FIG. 5. The control module 60 electrically connects to an electrical junction box 70 that is located on a base plate 30 by means of electrical wiring 26 in a wiring harness 27. The wiring harness 27 is discreetly routed along the frame member 110 and secured to the frame member 110 by a plurality of wire ties 29. The wiring 26 in the wiring harness 27 are terminated at each end using connecting plugs 28. The connecting plugs 28 are inserted onto a control module jack 68 (see FIG. 4) on the control module 60 and into a connecting jack 71 (see FIG. 5) in the electrical junction box 70.

The connecting plugs 28 are preferably reversible. That is, the connecting plugs 28 are the same so that the wiring harness 27 can be reversed. The control module 60 includes a two-position power switch 64 (ON and OFF) and an adjustable speed dial 66. The adjustable speed dial 66 can be adjusted to provide various rocking motion rates. For example, a slow oscillating motion while an infant is sleeping or a faster motion for infants who prefer a more vigorous rocking motion.

Refer now specifically to FIG. 2, which is an isometric view of the drive assembly 20 of the reciprocating infant stroller assembly 10. The motor 21, a battery compartment 24 with a lid 25, and the electrical junction box 70 are all affixed to the base plate 30. The base plate 30 is preferably a steel plate for strength. However, other materials, such as polymers and composite materials can be substituted without limiting the scope of the reciprocating infant stroller assembly 10.

The drive assembly 20 further includes a plurality of fastening apertures 32 for attaching the base plate 30 to the infant stroller. The fastening apertures 32 receive "U" bolts 34a and/or "J" bolts 34b which are held in place by nut fasteners 36 to secure the drive assembly 20 to the infant stroller 100. In practical retro-fit applications the base plate 30 may be adapted by a user to fit the desired infant stroller 100. It may be appreciated that different embodiments of the reciprocating infant stroller assembly 10 may be introduced via installation kits. Such kits may include properly shaped mounting base plates and fasteners for fitting the reciprocating infant stroller assembly 10 to a frame member 110 or axle 114 of different models of infant strollers 100.

The motor 21 may be any of a variety of commercially available, preferably copper wound, low voltage, small frame, direct current motors having a cylindrical motor shaft 22. The cylindrical motor shaft 22 is preferably equipped with an attachment flat and threads such as are common in small DC motors. The motor 21 is capable of generating sufficient torque to induce the desired rocking motion of the infant stroller 100.

The motor 21 is electrically powered by the control module 60 which receives electrical power from the rechargeable battery 23, which is located within the battery compartment 24. As previously noted the battery compartment 24 is mounted to the base plate 30 and includes a lid 25. The lid 25 is beneficially equipped with a latch 75 to retain the rechargeable battery 23 in place until removal is desired. Electrical connections for the motor 21 and the rechargeable battery 23 are hard wired within the electrical junction box 70 (see FIG. 5).

Referring now to FIGS. 2 and 3, the motor 21 moves a drive arm assembly 40 which is attached to the motor shaft 22 by a motor shaft nut 41. The drive arm assembly 40 includes a crank arm 43 which is preferably fabricated from steel. The crank arm 43 includes a crank arm hub 44 with a motor shaft aperture 37. The motor shaft aperture 37 is configured to create a sliding fit with a matching flat 42 on the motor shaft 22. Other embodiments of the present invention may incorporate alternate motor shaft 22 profiles and methods of attaching the crank arm 43 to the motor shaft 22.

Referring now to FIGS. 2 and 3, the drive arm assembly 40 includes a crank arm 43 having a crank arm aperture 45 on one (1) end and a crank arm hub 44 on the other. A threaded shank of a pitman ball joint 46 is inserted into the crank arm aperture 45 where it is held in place by two (2) pitman ball joint nuts 47. One (1) pitman ball joint nut 47 is on either side of the crank arm 43, specifically reference the exploded view shown in FIG. 3. This double nut mount secures the pitman ball joint 46 to the crank arm 43 such that crank arm 43 rotary motion is translated into a transverse motion by the socket of the pitman ball joint 46. The pitman ball joint 46 is mechanically connected to a drive stud 52 by a pitman arm 48 and a release mechanism 51 on the end of the pitman arm 48. Thus the traverse motion of the pitman ball joint 46 is transferred to the drive stud 52.

The drive stud 52 is preferably configured to freely rotate within the drive stud socket 56 of the release mechanism 51. This enables the reciprocating rocking motion to be implemented as the infant stroller 100 is pushed.

Referring now back to FIG. 1, the drive stud 52 is located either at the factory or by a user on a stroller wheel 115. Returning now to FIGS. 2 and 3, the release mechanism 51 is similar to a standard ball joint except for having a spring-loaded outer sleeve 107 configured to capture the drive stud 52 in a drive stud socket 56. The outer sleeve 107 captures and retains the drive stud 52 in the drive stud socket 56 until the user determines to discontinue the reciprocating motion.

Discontinuing reciprocating motion is achieved by turning the power switch 64 off to remove power from the motor 21. Then the spring-loaded sleeve 107 can be slid back toward the pitman arm 48 which enables removing the drive stud 52 from the drive stud socket 56. When the drive stud 52 is removed the infant stroller 100 may be used simply to transport an infant without a rocking motion.

Still referring to FIGS. 2 and 3, the pitman ball joint 46 and the release mechanism 51 are respectively firmly attached to the pitman arm 48 by a pitman adjusting nut 49a and by a pitman tensioning nut 49b. Those tensioning nuts 49a, 49b are useful for making the required spatial adjustments to properly position the drive stud 52 on the wheel 115.

Turning now to the electrical diagram of FIG. 5, the control module 60 of the reciprocating infant stroller assembly 10 is a standard "black box" enclosure which protects the electrical and electronic equipment contained therein. Such electrical and electronic equipment includes components such as, but not necessarily limited to; the power switch 64, the speed dial 66, internal connection wiring 26, and any supporting circuit boards, fuses, and the like.

The control module 60 includes the control module jack 68 into which a connecting plug 28 of the wiring harness 27 is inserted. The wiring harness 27 provides electrical interconnections with the electrical junction box 70. When installing the reciprocating infant stroller assembly 10 on an infant stroller 100 the wiring harness 27 is routed from the control module 60 to the electrical junction box 70 along frame members 110 as shown in FIG. 1. As previously noted the wiring harness 27 is fastened to the frame members 110 with wire ties 29 to prevent the wiring harness 27 from becoming entangled in the moving parts of the infant stroller 100. The connecting plugs 28, connecting jack 71, and control module jack 68 simplify the electrical interconnections.

The preferred embodiment of the present invention can be utilized by the common user in a simple and effortless manner with little or no training after the original installation of the reciprocating infant stroller assembly 10. After initial purchase or acquisition it would be installed on an existing or new infant stroller 100 as indicated in FIG. 1.

The method of installing and using the reciprocating infant stroller assembly 10 may be achieved by performing the following steps: acquiring a model of the reciprocating infant stroller assembly 10 having the desired hardware to accommodate the installation on an infant stroller 100; installing the base plate 30 with the attached drive components to the frame members 110 of the infant stroller 100 using the "U" bolts 34a, "J" bolts 34b, and nut fasteners 36; installing the drive stud 52 on a wheel 115; installing the control module 60 on the push handle 120 using the restraining straps 62; inserting the connecting plug 28 on one (1) end of the wiring harness 27 into the control module jack 68 on the control module 60; inserting the connecting plugs 28 on the opposite end of the wiring harness 27 into the control jack 71 on the electrical junction box 70 (located on the base plate 30); routing the wiring harness 27 along the stroller frame members 110 between the points of connection of the wiring harness 27 and securing the wiring harness to the frame members 110 with wire ties 29 to prevent the wiring harness from becoming entangled in any moving parts; installing and electrically attaching a fully charged battery 23 in the battery compartment 24 and securing it therein by closing the lid 25 and then using the latch 75 to latch the lid 25 closed; connecting the drive stud 52 to the release mechanism 51; turning on the power switch 64; and adjusting the speed dial 66 to achieve the desired oscillating motion.

It can be seen that after the initial installation of the reciprocating infant stroller assembly 10 the steps of operation become greatly simplified and only involve moving the infant stroller 100 to the desired location; connecting the drive stud 52 on the wheel to the release mechanism 51; turning on the power switch 64; and adjusting the speed dial 66 located on the control module 60. The infant stroller 100 can be used without a rocking motion by separating the release mechanism 51 from the drive stud 52.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A reciprocating infant stroller, comprising:
   an infant stroller having a frame, an axle, a push handle, and a wheel;
   a drive assembly mounted on said infant stroller, said drive assembly including an electric motor having a rotating shaft for producing rotary motion, a battery for powering said motor, an electrical junction box retaining electrical connections for wiring said battery to said motor, and a drive arm assembly attached to said rotating shaft for converting said rotary motion into an oscillating motion, said drive arm assembly including a drive stud that is selectively in contact with said wheel;
   a control module mounted to said infant stroller, said control module having a power switch, an adjustable speed control for controlling power input to said motor, and electrical connections supporting passing power from said battery through said power switch and said adjustable speed control to said motor; and,
   a wiring harness electrically interconnecting said electrical junction box to said control module;
   wherein said drive arm assembly includes:
      a crank arm having a crank arm hub with a motor shaft aperture at one end that receives said rotating shaft and a crank arm aperture at the other end;
      a crank arm assembly attached to said crank arm aperture at one end and to said drive stud at the other;
      a release mechanism for disconnecting said drive stud from said crank arm assembly, including a drive stud socket for receiving said drive stud and a spring-loaded sleeve configured to capture said drive stud when in said drive stud socket;
   wherein said wiring harness, said control module electrical connections, and said electrical junction box electrical connections provide controlled electrical power from said battery to said motor;
   wherein said adjustable speed control causes said motor to provide various rotary motion rates; and,
   wherein said oscillating motion causes said drive stud to push on said wheel to impart a rocking motion to said infant stroller.

2. The reciprocating infant stroller according to claim 1, wherein said drive assembly is mounted to said axle.

3. The reciprocating infant stroller according to claim 1, wherein said drive assembly is mounted to said frame.

4. The reciprocating infant stroller according to claim 1, wherein said control module is attached to said push handle.

5. The reciprocating infant stroller according to claim 4, wherein said control module is attached to said push handle by at least one restraining strap that is laced through at least two mounting channels of said control module.

6. The reciprocating infant stroller according to claim 1, wherein said wiring harness is routed along said frame.

7. The reciprocating infant stroller according to claim 6, wherein said wiring harness is secured to said frame member by a plurality of wire ties.

8. The reciprocating infant stroller according to claim 7, wherein said wiring harness is terminated at each end by similar connecting plugs.

9. The reciprocating infant stroller according to claim 8, wherein each of said similar connecting plugs mates with a control module jack and with a junction box connecting jack.

10. The reciprocating infant stroller according to claim 8, wherein said drive assembly further includes a base plate, and wherein said motor and said electrical junction box are affixed to said base plate.

11. The reciprocating infant stroller according to claim 10, wherein said drive assembly further includes a battery compartment affixed to said base plate and retaining said battery.

12. The reciprocating infant stroller according to claim 11, wherein said battery compartment includes a lid and a latch for securing said lid closed.

13. The reciprocating infant stroller according to claim 11, further including a fastening aperture and an attachment bolt that passes through said fastening aperture and which is configured to secure said drive assembly to said infant stroller.

14. The reciprocating infant stroller according to claim 1, wherein said drive stud can be removed from said drive stud socket when said spring-loaded sleeve is slid away from said drive stud.

15. The reciprocating infant stroller according to claim 1, wherein said crank arm assembly is attached to said crank arm by a pitman ball joint.

16. The reciprocating infant stroller according to claim 1, wherein said release mechanism is a pitman arm.

17. The reciprocating infant stroller according to claim 16, wherein said pitman arm is adjustable in length.

* * * * *